United States Patent
Shpilyuck et al.

(12) 
(10) Patent No.: US 12,423,187 B1
(45) Date of Patent: Sep. 23, 2025

(54) DETECTING CONFIGURATION ISSUES DURING PRE-CANARY DEPLOYMENT

(71) Applicant: Dell Products L.P., Round Rock, TX (US)

(72) Inventors: Boris Shpilyuck, Ashdod (IL); Jehuda Shemer, Kfar Saba (IL); Igor Dubrovsky, Beer-Sheva (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/645,009

(22) Filed: Apr. 24, 2024

(51) Int. Cl.
*G06F 11/00* (2006.01)
*G06F 11/07* (2006.01)
*G06F 11/14* (2006.01)

(52) U.S. Cl.
CPC ........ *G06F 11/142* (2013.01); *G06F 11/0781* (2013.01)

(58) Field of Classification Search
CPC ............................ G06F 11/142; G06F 11/0781
See application file for complete search history.

(56) References Cited

U.S. PATENT DOCUMENTS

| | | |
|---|---|---|
| 7,370,318 B1 | 5/2008 | Howe et al. |
| 8,020,146 B2 | 9/2011 | Hudson, Jr. |
| 9,268,663 B1 | 2/2016 | Siddiqui et al. |
| 10,019,255 B1 | 7/2018 | Greenfield et al. |
| 11,281,447 B2 * | 3/2022 | Sn ..................... G06F 11/3466 |
| 2008/0148225 A1 | 6/2008 | Sarkar et al. |
| 2017/0046146 A1 * | 2/2017 | Jamjoom ................. G06F 8/62 |
| 2017/0351597 A1 | 12/2017 | Baset et al. |
| 2020/0358846 A1 | 11/2020 | Bonas et al. |
| 2020/0366580 A1 * | 11/2020 | Sinha .................. H04L 43/0817 |
| 2022/0156059 A1 | 5/2022 | Schumaker |
| 2022/0197606 A1 | 6/2022 | Rodgers et al. |

(Continued)

FOREIGN PATENT DOCUMENTS

| CN | 108762768 A | 11/2018 |
|---|---|---|
| CN | 111279319 A | 6/2020 |

OTHER PUBLICATIONS

Office Action mailed Mar. 12, 2024 for U.S. Appl. No. 17/935,275, 29 pages.

(Continued)

*Primary Examiner* — Jason B Bryan
(74) *Attorney, Agent, or Firm* — Amin, Turocy & Watson, LLP

(57) ABSTRACT

A system can determine that there is a failed configuration in a microservices architecture, wherein the microservices architecture comprises a group of microservices. The system can order the microservices of the group to produce an ordered group of microservices, wherein the ordering first comprises failed microservices of the group of microservices, then dependent microservices of the group of microservices, and wherein respective failed microservices of the failed microservices depend on respective dependent microservices of the dependent microservices. The system can perform iterations of, splitting the ordered group of microservices into two subgroups of microservices, and reverting changes to one of the two subgroups of microservices. The system can determine that a microservice of the group of microservices has the failed configuration based on a result of the performing of the iterations.

20 Claims, 15 Drawing Sheets

(56) References Cited

U.S. PATENT DOCUMENTS

| | | |
|---|---|---|
| 2023/0081153 A1 | 3/2023 | Boguslavsky et al. |
| 2023/0342122 A1 | 10/2023 | Shpilyuck et al. |
| 2024/0103831 A1 | 3/2024 | Shemer et al. |
| 2024/0103833 A1 | 3/2024 | Shemer et al. |
| 2024/0103834 A1 | 3/2024 | Shemer et al. |

OTHER PUBLICATIONS

Tarvo, Alexander, et al., "CanaryAdvisor: a statistical-based tool for canary testing (demo)", ISSTA 2015: Proceedings of the 2015 International Symposium on Software Testing and Analysis, Jul. 2015, 5 pages, [retrieved on Mar. 4, 2024], Retrieved from the Internet:<URL:http://dl.acm.org/>.

Schermann, Gerald, et al., "Bifrost—Supporting Continuous Deployment with Automated Enactment of Multi-Phase Live Testing Strategies", Middleware '16: Proceedings of the 17th International Middleware Conference, Nov. 2016, 14 pages, [retrieved on Mar. 4, 2024], Retrieved from the Internet: <URL:http://dl.acm.org/>.

Office Action mailed Mar. 7, 2024 for U.S. Appl. No. 17/935,335, 50 pages.

Office Action mailed Apr. 26, 2023 for U.S. Appl. No. 17/660,123, 53 pages.

Shpilyuck et al. "Canary Deployments Based On Configuration Complexity In Containerized Environments" U.S. Appl. No. 18/643,897, filed Apr. 23, 2024, 56 pages.

Notice of Allowance mailed Jan. 31, 2024 for U.S. Appl. No. 17/660,123, 105 pages.

Office Action mailed Sep. 13, 2023 for U.S. Appl. No. 17/660,123, 87 pages.

Notice of Allowance mailed May 16, 2024 for U.S. Appl. No. 17/660,123, 79 pages.

Notice of Allowance mailed Aug. 12, 2024 for U.S. Appl. No. 17/935,275, 19 pages.

Office Action mailed May 23, 2024 for U.S. Appl. No. 17/935,325, 13 pages.

Office Action mailed Jul. 9, 2024 for U.S. Appl. No. 17/935,335, 26 pages.

Notice of Allowance mailed Sep. 17, 2024 for U.S. Appl. No. 17/935,335, 34 pages.

Notice of Allowance mailed Dec. 17, 2024 for U.S. Appl. No. 17/935,325, 29 pages.

\* cited by examiner

CANARY DEPLOYMENTS BASED ON CHANGESET COMPLEXITY IN CONTAINERIZED ENVIRONMENTS COMPONENT 514

CONFIGURATION 502

```
apiVersion: security.example.com/v1beta1
kind: AuthorizationPolicy
metadata:
 name: pricing
 namespace: staging
spec:
 selector:
   matchLabels:
     app: pricing
     version: v1
 action: ALLOW
 rules:
 - from:
   - source:
       principals: ["cluster.local/ns/default/sa/orders"]
   to:
   - operation:
       methods: ["GET"]
   when:
   - key: request.auth.claims[roles]
     values: ["customer", "admin"]
```

DETERMINING THERE IS A FAILED CONFIGURATION IN A MICROSERVICES ARCHITECTURE THAT COMPRISES MICROSERVICES 1404

↓

ORDERING THE MICROSERVICES TO PRODUCE ORDERED MICROSERVICES 1406

↓

IDENTIFYING THAT A MICROSERVICE OF THE MICROSERVICES HAS THE FAILED CONFIGURATION BASED ON PERFORMING ITERATIONS OF, SPLITTING THE ORDERED MICROSERVICES INTO TWO GROUPS OF MICROSERVICES, AND REVERTING CHANGES TO ONE OF THE TWO GROUPS OF MICROSERVICES 1408

DETECTING CONFIGURATION ISSUES DURING PRE-CANARY DEPLOYMENT

BACKGROUND

Computer programs that are operating in production can be updated, and these updated versions of the programs can be introduced into production.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine that there is a failed configuration in a microservices architecture, wherein the microservices architecture comprises a group of microservices. The system can order the microservices of the group to produce an ordered group of microservices, wherein the ordering first comprises failed microservices of the group of microservices, then dependent microservices of the group of microservices, and wherein respective failed microservices of the failed microservices depend on respective dependent microservices of the dependent microservices. The system can perform iterations of, splitting the ordered group of microservices into two subgroups of microservices, and reverting changes to one of the two subgroups of microservices. The system can determine that a microservice of the group of microservices has the failed configuration based on a result of the performing of the iterations.

An example method can comprise determining, by a system comprising at least one processor, that there is a failed configuration in a microservices architecture, wherein the microservices architecture comprises a group of microservices. The system can further comprise ordering, by the system, the microservices of the group to produce an ordered group of microservices, wherein the ordering first comprises failed microservices of the group of microservices, then dependent microservices of the group of microservices, wherein respective failed microservices of the failed microservices depend on respective dependent microservices of the dependent microservices. The system can further comprise determining, by the system, that a microservice of the group of microservices has the failed configuration based on performing iterations of, splitting the ordered group of microservices into two subgroups of microservices, and reverting changes to one of the two subgroups of microservices.

An example non-transitory computer-readable medium can comprise instructions that, in response to execution, cause a system comprising a processor to perform operations. These operations can comprise determining that there is a failed configuration in a microservices architecture that comprises microservices. These operations can further comprise ordering the microservices to produce ordered microservices. These operations can comprise identifying that a microservice of the microservices has the failed configuration based on performing iterations of, splitting the ordered microservices into two groups of microservices, and reverting changes to one of the two groups of microservices.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 illustrates an example configuration that can facilitate detecting configuration issues during pre-canary deployment, in accordance with an embodiment of this disclosure;

FIG. 14 illustrates an example process flow that can facilitate detecting configuration issues during pre-canary deployment, in accordance with an embodiment of this disclosure;

DETAILED DESCRIPTION

Overview

The present techniques generally relate to automating upgrade processes of live systems. In contemporary containerized environments, new changes can be introduced in a form of "canary deployments." That is, an "old" version of the microservice (which can be referred to as a production version) and a "new" version that contains the change (which can be referred to as a canary version) can be active at the same time. It can be that, initially, a canary version receives just a small portion of traffic in order to minimize how widely problems can spread.

Then, where no problems are encountered, an amount of traffic to the canary version can be increased gradually by a canary deployment operator, until 100% of the traffic is switched to the canary version. After that, the "old" production version can be decommissioned, and a canary version can be labeled as the production version. There can be a question is how much traffic should be directed to the canary version, and at what rate should the traffic be increased.

There can be a problem with canary deployments in a form of configuration failures. The present techniques can be implemented to facilitate pre-deployment analysis to aid in identifying configuration failures. Pre-deployment tests can be implemented, and can fail the deployment if they do not pass. Where the tests do fail, the situation can be mitigated according to the present techniques.

A multi-phase analysis can be performed that can help in detecting an offending configuration. Configuration complexity analysis and decomposition can aid in keeping a search field to a manageable size.

The present techniques can facilitate efficient detection of offending configurations in an automated continuous integration/continuous deployment (CI/CD) system. The present techniques can utilize smart heuristics and logical elimination to significantly reduce a search space, facilitating a practical and automated way of detecting bad configuration changes. In facilitating automatic detection of configuration offenders, the present techniques can implement both fast and semi subset traversal to efficiently reduce a search space.

Example Architectures, Etc.

Figure 1:
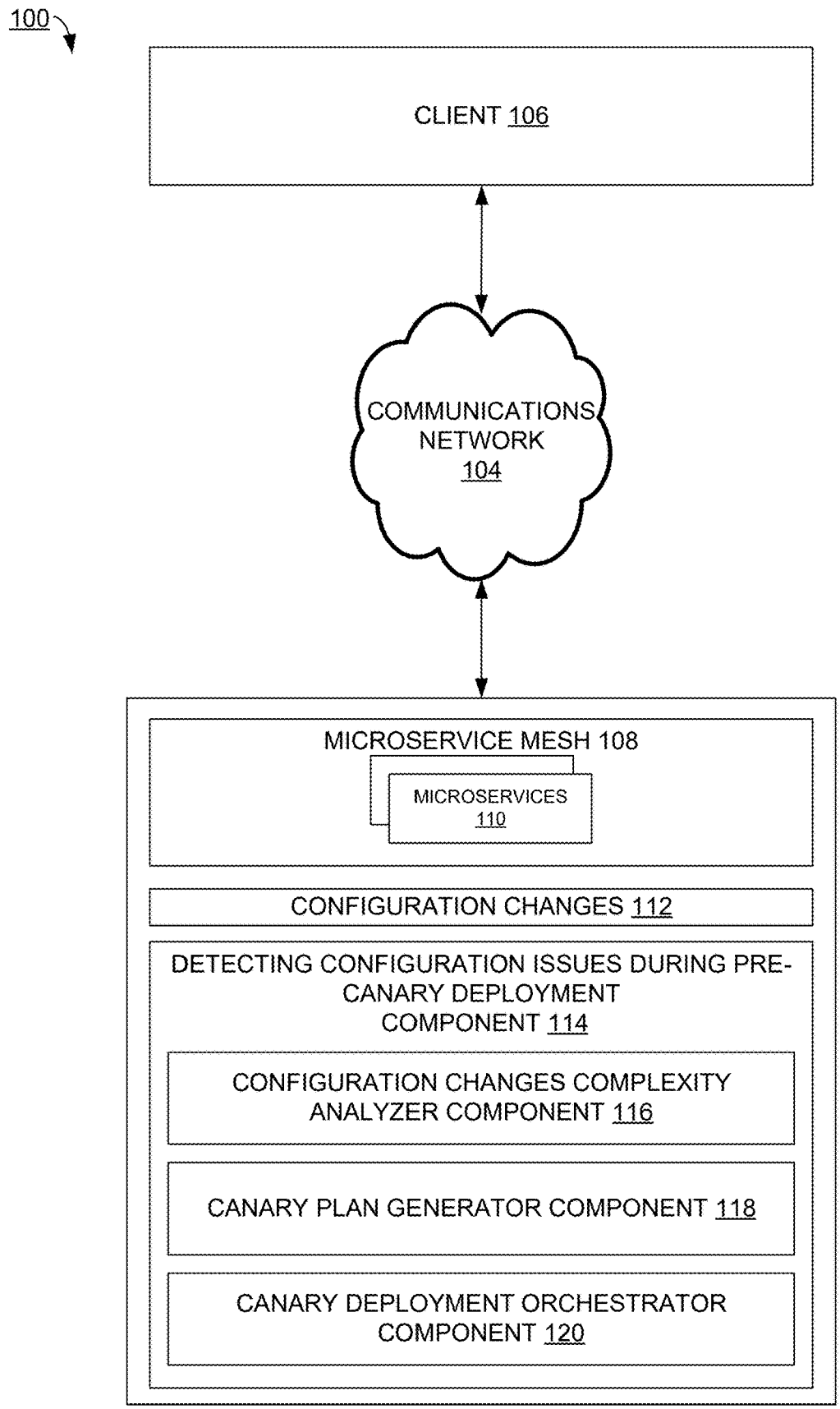
FIG. 1 illustrates an example system architecture that can facilitate detecting configuration issues during pre-canary deployment, in accordance with an embodiment of this disclosure.

FIG. 1 illustrates an example system architecture 100 that can facilitate detecting configuration issues during pre-canary deployment, in accordance with an embodiment of this disclosure.

System architecture 100 comprises server 102, communications network 104, and client 106. In turn, server 102 comprises microservices mesh 108, configuration changes 112, and detecting configuration issues during pre-canary deployment component 114. Microservices mesh 108 comprises microservices 110. Detecting configuration issues during pre-canary deployment component 114 comprises configuration changes complexity analyzer component 116, canary plan generator component 118, and canary deployment orchestrator component 120.

Figure 15:
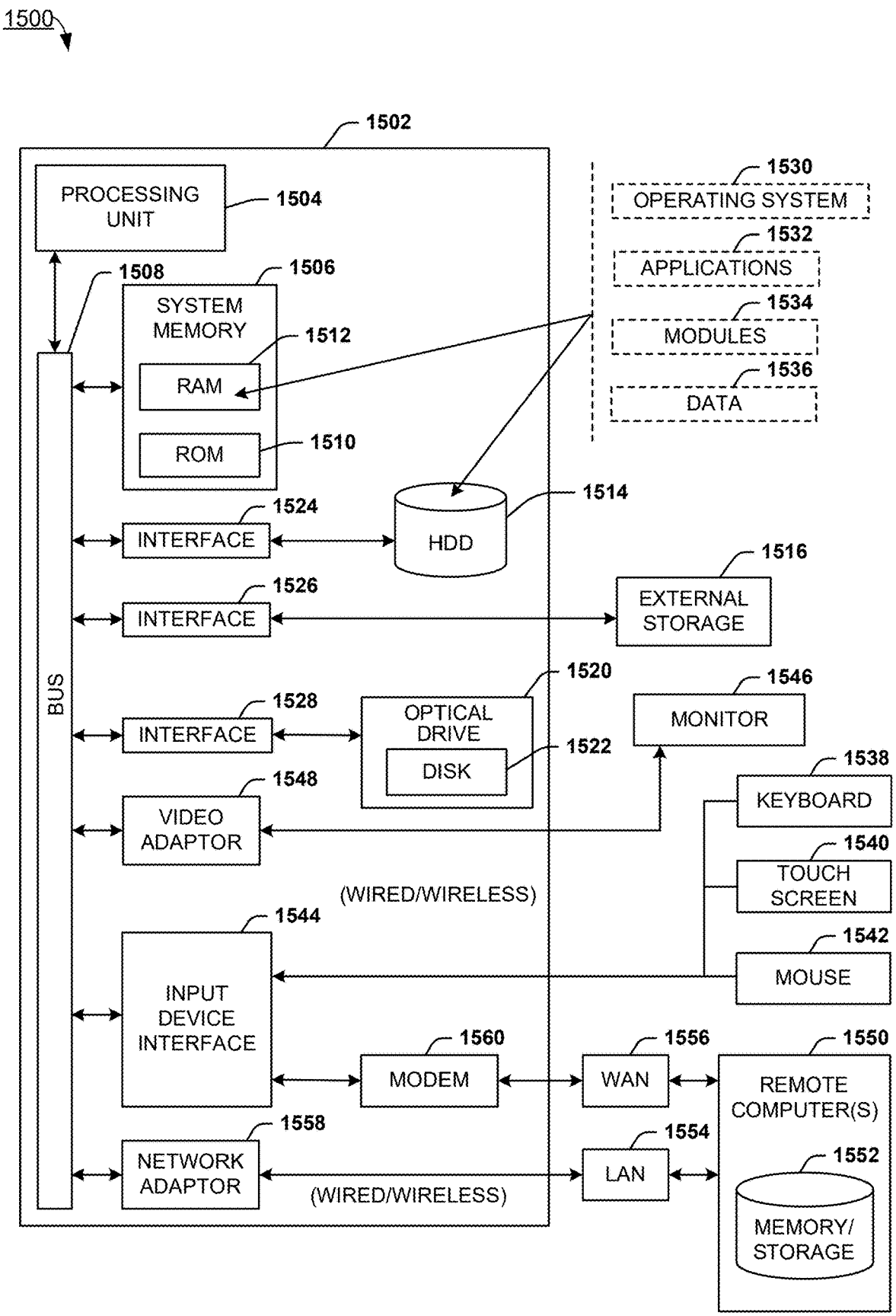
FIG. 15 illustrates an example block diagram of a computer operable to execute an embodiment of this disclosure.

Each of server 102 and/or client 106 can be implemented with part(s) of computing environment 1500 of FIG. 15. Communications network 104 can comprise a computer communications network, such as the Internet.

Microservices 110 can operate collectively to provide a computing service that is accessible by client 106 via communications network 104. Microservices 110 can be containerized, where each microservice operates in a separate computing container. This can be referred to as a "containerized environment."

Over time, an entity that creates microservices 110 can update configuration information used for the microservices. This updated configuration information can be stored as configuration changes 112. It can be that an entity that manages microservices 110 wants to perform a progressive deployment (sometimes referred to as a "canary deployment") of gradually increasing traffic to a new version of a particular microservice, and from an older version of that particular microservice that is currently in production. This can be used to identify errors with the new version before the new version serves all users.

Performing such a canary deployment can be performed by detecting configuration issues during pre-canary deployment component 114. Configuration changes complexity analyzer component 116 can determine a complexity of configuration changes 112. Canary plan generator component 118 can determine a plan for progressively deploying the new version of the microservice based on the result of configuration changes complexity analyzer component 116. Canary deployment orchestrator component 120 can implement a progressive deployment of the new version of the microservice based on the plan determined by canary plan generator component 118.

Detecting configuration issues during pre-canary deployment component 114 can also detect configuration issues before beginning a canary deployment.

Figure 6:
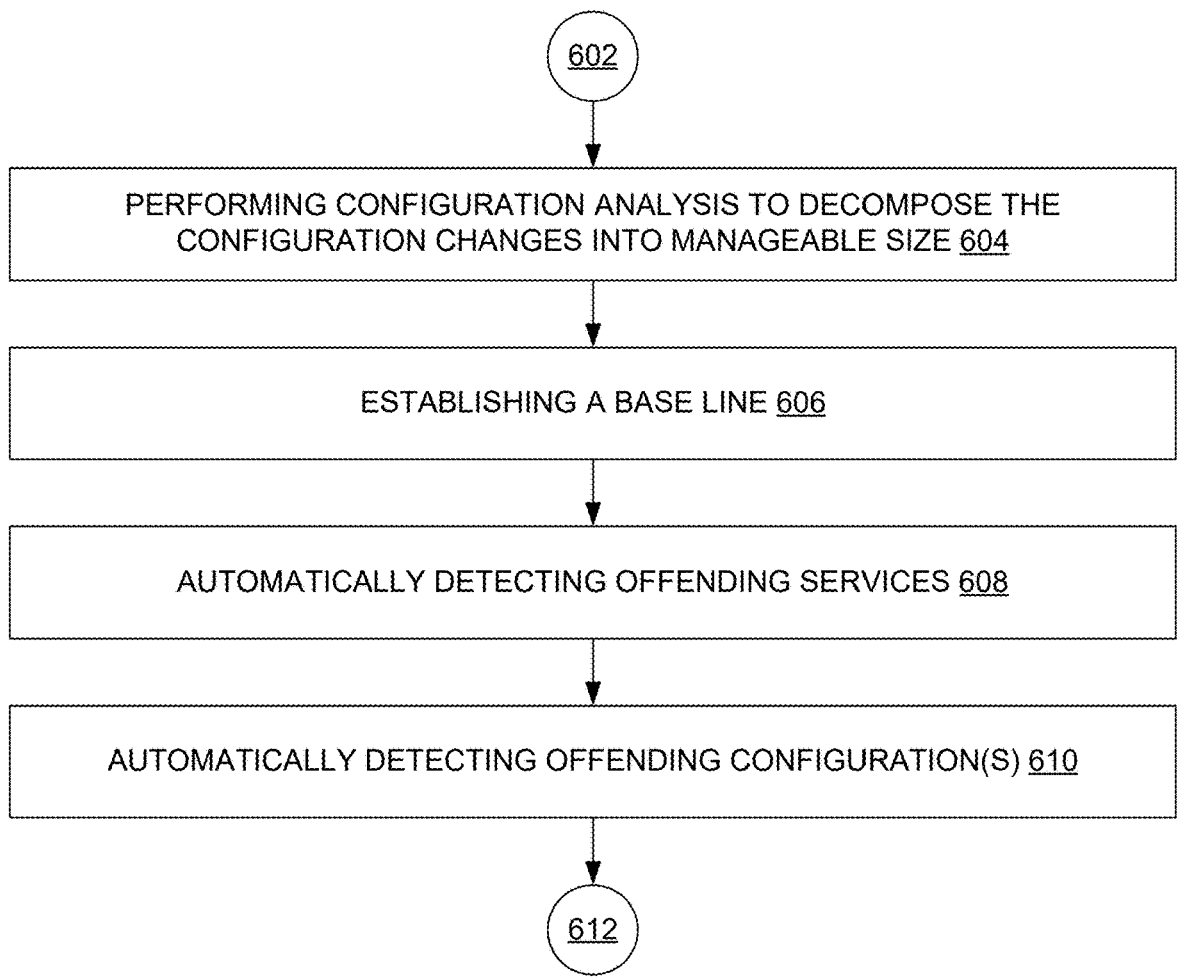
FIG. 6 illustrates an example process flow that can facilitate detecting configuration issues during pre-canary deployment, in accordance with an embodiment of this disclosure.

In some examples, detecting configuration issues during pre-canary deployment component 114 can implement part(s) of the process flows of FIGS. 6 and/or 8-14 to facilitate detecting configuration issues during pre-canary deployment.

It can be appreciated that system architecture 100 is one example system architecture for proactive prevention of data unavailability and data loss, and that there can be other system architectures that facilitate detecting configuration issues during pre-canary deployment.

Figure 2:
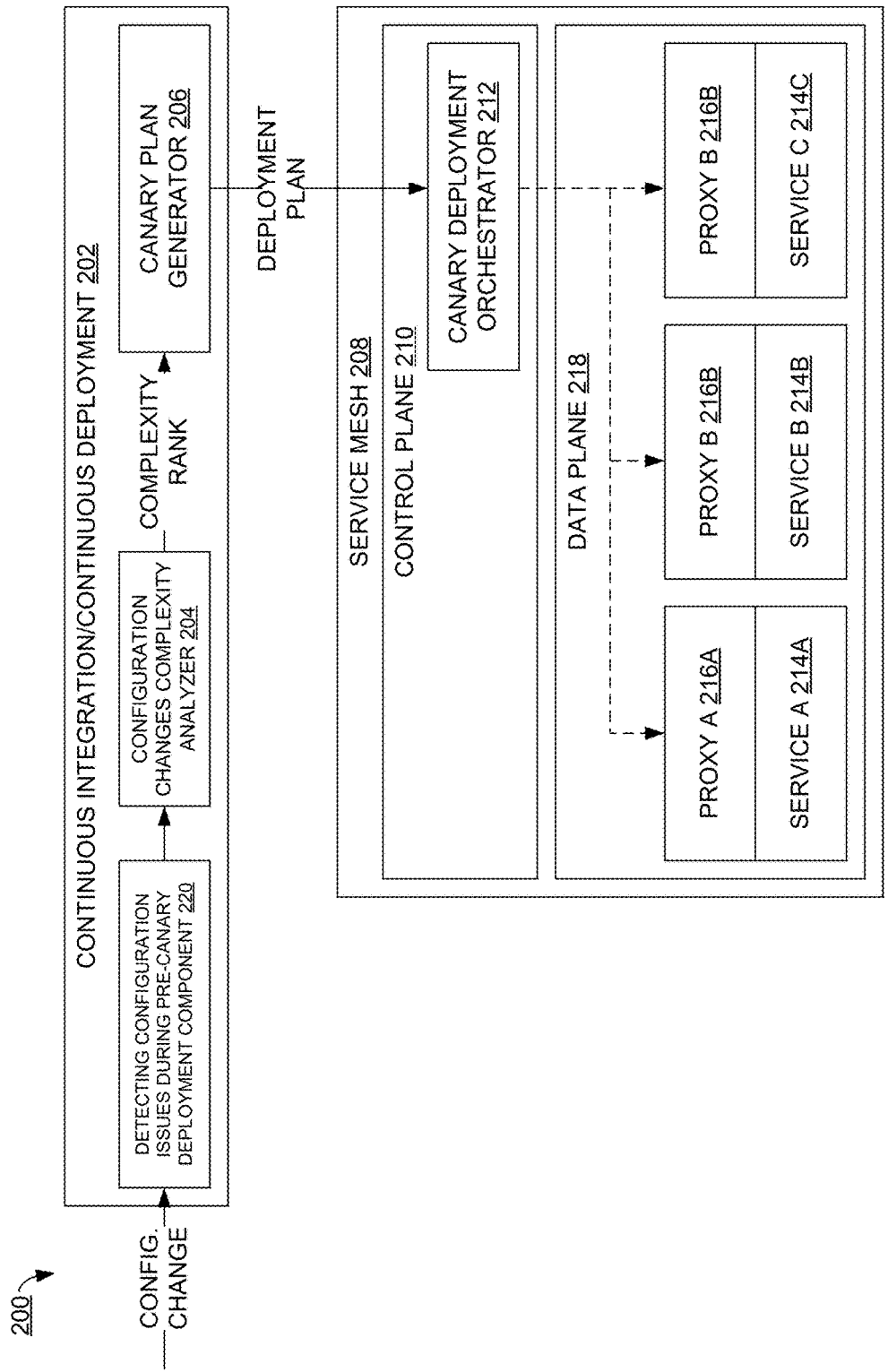
FIG. 2 illustrates another example system architecture that can facilitate detecting configuration issues during pre-canary deployment, in accordance with an embodiment of this disclosure.

FIG. 2 illustrates another example system architecture 200 that can facilitate detecting configuration issues during pre-canary deployment, in accordance with an embodiment of this disclosure. In some examples, part(s) of system architecture 200 can be implemented by system architecture 100 to facilitate detecting configuration issues during pre-canary deployment.

System architecture 200 comprises continuous integration/continuous deployment 202, configuration changes complexity analyzer 204 (which can be similar to configuration changes complexity analyzer component 116 of FIG. 1), canary plan generator 206 (which can be similar to canary plan generator component 118), service mesh 208, control plane 210, canary deployment orchestrator 212 (which can be similar to canary deployment orchestrator component 320), service A 214A, service B 214B, service C 214C, proxy A 216A, proxy B 216B, proxy C 216A, data plane 218, and detecting configuration issues during pre-canary deployment component 220 (which can be similar to detecting configuration issues during pre-canary deployment component 114 of FIG. 1).

Continuous integration/continuous deployment 202 can comprise a computer component that facilitates building, testing and deployment of programs. Service mesh 208 can comprise a computer component that facilitates an infrastructure layer for facilitating service-to-service communications between services or microservices (e.g., service 214A-C), using a proxy (e.g., proxy 216A-C). Control plane 210 can comprise a part of service mesh 208 that manages and configures proxies. Data plane 218 can comprise a part of service mesh 208 that facilitates communication between services and load balancing between multiple instances of a given service.

In some examples, the present techniques can encompass analyzing a configuration change's complexity; generating a canary deployment plan based on the configuration change's complexity; and automatically orchestrating the canary deployment based on the generated canary deployment plan.

A system that implements the present techniques can comprise configuration changes complexity analyzer 204, canary plan generator 206, and canary deployment orchestrator 212. System architecture 200 presents these components logically, and it can be appreciated that there can be other systems that implement the present techniques in a different manner.

Configuration changes complexity analyzer 204 can be incorporated into an ecosystem of continuous integration/continuous deployment (CI/CD) 202, and upon submission of a configuration change (e.g., configuration changes 112 of FIG. 1), determine a configuration change's complexity, then produce a complexity rank (e.g., a numeric value between 1 and 100) according to the corresponding complexity.

Canary plan generator 206 can be incorporated into an ecosystem of continuous integration/continuous deployment 202. Canary plan generator 206 can use a complexity rank produced by configuration changes complexity analyzer 204, and generate a corresponding canary deployment plan.

Detecting configuration issues during pre-canary deployment component 220 can be incorporated into an ecosystem of continuous integration/continuous deployment 202. Detecting configuration issues during pre-canary deployment component 220 can identify configuration issues before a canary deployment is otherwise implemented.

A canary deployment plan can comprise a list of steps, and conditions to move to a next step, in a canary deployment. Each step can identify a counter of a minimum number of requests that should be handled at this step; a minimum amount of time to stay in this step; and/or other conditions.

A canary deployment plan can indicate both a minimum number of calls processed and a minimum amount of time that passes to move to a next step in a canary deployment. For example, a canary deployment plan can indicate a minimum of both 1,000 requests and 90 seconds. That is, the process can stay in this step until at least 1,000 requests have been processed, and at least 90 seconds have passed in this step. This can ensure that exposure is significant, and that the system has had enough time to propagate a result. Where either parameter is defined as 0 in a canary deployment plan, it can indicate that only one aspect is the trigger to move to a next step.

In some examples, defining each step separately can be performed, and can allow for granular control. In other examples, a canary plan generator can simplify a generation of steps by using a function to define the steps, and fixed parameters for the rest. Such a function can be a monotonically increasing function, as depicted in graph 400 of FIG. 4.

Additionally, with a canary deployment plan, a fixed number of requests and a fixed amount of time per step can be used. In other examples, these values can be a function of the step number—e.g., 1,000 requests for step 1, 2,000 requests for step 2, etc. (and a similar approach for the time values).

In some examples, a basic canary deployment plan can therefore be made up of a triplet—[#steps, #requests, #time]. Expressed in more detail, this can be, [number of steps, minimum number of requests to be forwarded to the canary version per step, minimum time to stay per step].

In some examples, a canary deployment plan can have additional parameters to govern behavior of corresponding functions.

The present examples can generally involve using an Nth root function (similar to function 408 of FIG. 4), and a fixed number of requests and amount of time for a step.

For example, a canary deployment plan of [7, 5,000, 30] can mean that there are 7 steps, and in order to move to the next step both 5,000 requests must be forwarded to the canary version of the microservice, and at least 30 seconds must elapse in that step. The percentage of traffic that will be forwarded to the canary version for each step is, for instance, 1.93%, 3.73%, 7.20%, 11.9%, 26, 82%, 51.8%, 100%. That is, as there are 7 steps in this example, each step is based on the $7^{th}$ root of 100, e.g., $100^{(1/7)}$, $100^{(2/7)}$, ... $100^{(7/7)}$ (which is 100%).

Combined together, in some examples, the higher the complexity rank, the more steps there will be, and the slower the percentage of request forwarded to the canary version per each step and time in each is. This approach can allow achieving an acceptable balance between passing deployments through at a reasonable rate, but also not affecting too many users in case there is a problem with the configuration changes.

In some examples, as described herein, a number of steps can be automatically derived, and a complete canary deployment plan can also be automatically derived as a result.

Canary deployment orchestrator 212 can be incorporated into an ecosystem of service mesh 208.

Service mesh 208 can generally comprise a dedicated infrastructure layer that allows the transparent addition of capabilities like observability, traffic management, security, and canary deployments, without adding them to the code of a specific service. In some examples, in order to support canary deployments, a canary deployment operator can use a service mesh's ability to split traffic between production and canary versions at a given proportion. However, this approach can be a manual process, with the proportion itself specified by the canary deployment operator.

Upon a continuous integration/continuous deployment's pipeline completion, canary deployment orchestrator 212 can get a canary deployment plan produced by canary plan generator 206, and automatically execute it step-by-step. Canary deployment orchestrator 212 can verify that, per each step, the relevant percentage of requests are forwarded to the canary version. Once the required number of requests per step are achieved, and the required time has passed, canary deployment orchestrator 212 can move to a next step (with a higher canary traffic percentage), and so on, until everything is switched to the canary version (where the canary version is operating successfully).

In the example of system architecture 200, configuration changes complexity analyzer 204 and canary plan generator 206 are incorporated into an ecosystem of continuous integration/continuous deployment 202, while canary deployment orchestrator 212 is incorporated into a control plane ecosystem of the service mesh 208. Configuration changes complexity analyzer 204 can receive a configuration change, determine its complexity rank, and pass that information to canary plan generator 206. Canary plan generator 206 can generate a canary deployment plan, and pass the canary deployment plan to canary deployment orchestrator 212, which, in turn, can instruct the service mesh's proxies (e.g., proxy 216A-C) to split the traffic between canary versions and production versions of a service (e.g., service 214A-C) in proportion as defined by the canary deployment plan.

Figure 3:
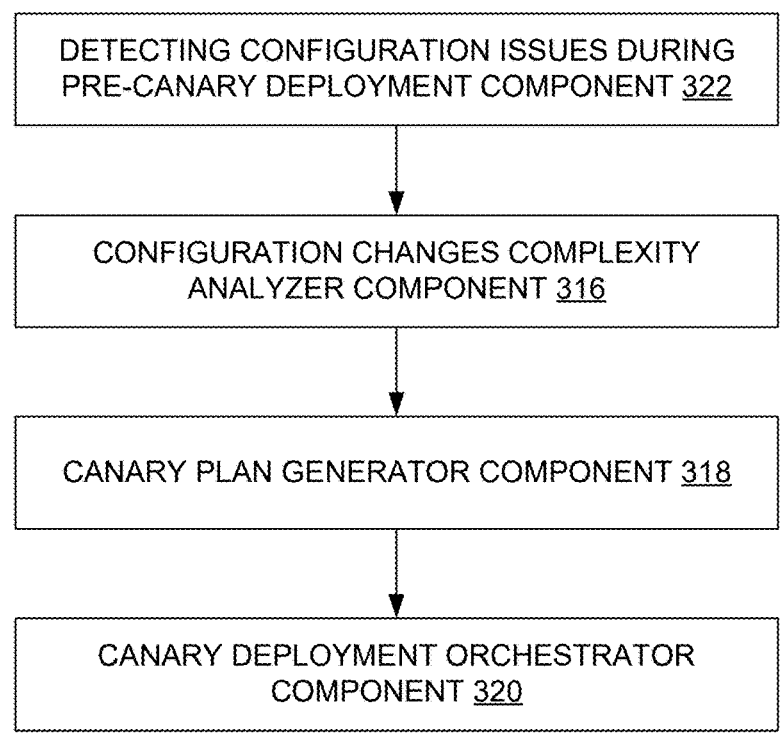
FIG. 3 illustrates another example system architecture that can facilitate detecting configuration issues during pre-canary deployment, in accordance with an embodiment of this disclosure.

FIG. 3 illustrates another example system architecture 300 that can facilitate detecting configuration issues during pre-canary deployment, in accordance with an embodiment of this disclosure.

System architecture 300 comprises detecting configuration issues during pre-canary deployment component 322, configuration changes complexity analyzer component 316, canary plan generator component 318, and canary deployment orchestrator component 320. Detecting configuration issues during pre-canary deployment component 322 can be similar to detecting configuration issues during pre-canary deployment component 220 of FIG. 2. Configuration changes complexity analyzer component 316, canary plan generator component 318, and canary deployment orchestrator component 320 can be similar to configuration changes complexity analyzer component 116, canary plan generator component 118, and canary deployment orchestrator component 120 of FIG. 1, respectively.

It can be appreciated that system architecture 300 presents an example system architecture according to the present techniques logically, and that there can be other implementations of the present techniques.

In system architecture 300, for a given configuration change for one or more microservices (e.g., configuration changes 112 of FIG. 1), detecting configuration issues during pre-canary deployment component 322 can initially determine whether there are configuration issues before the canary plan is otherwise carried out (or before the canary plan is fully carried out). Configuration changes complexity analyzer component 316 can determine a complexity of the configuration changes. Canary plan generator component 318 can determine a plan for progressively deploying the new version of the microservice based on the result of configuration changes complexity analyzer component 316. Canary deployment orchestrator component 320 can implement a progressive deployment of the new version of the microservice based on the plan determined by canary plan generator component 318.

Figure 4:
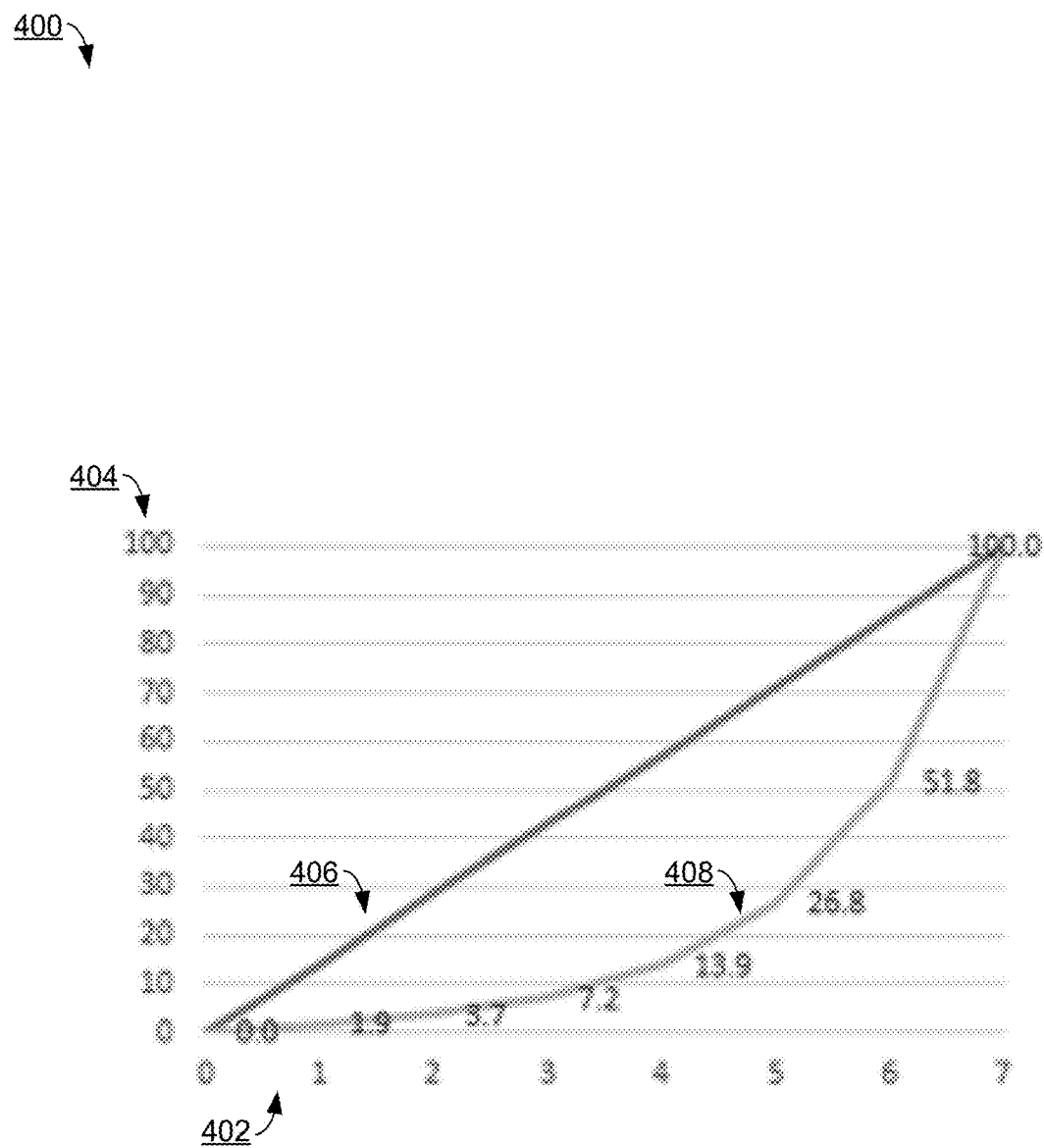
FIG. 4 illustrates an example graph for increasing traffic directed to a canary version, and that can facilitate detecting configuration issues during pre-canary deployment, in accordance with an embodiment of this disclosure.

FIG. 4 illustrates an example graph 400 for increasing traffic directed to a canary version, and that can facilitate detecting configuration issues during pre-canary deployment, in accordance with an embodiment of this disclosure.

In some examples, information in graph 400 can be used by canary plan generator component 118 of FIG. 1 to determine a percentage of traffic to direct to a new version of a microservice (compared with a current, production version of the microservice) at various steps in a canary deployment.

Graph 400 comprises X-axis 402 (indicating a step number in a deployment), and Y-axis 404 (indicating a percentage of traffic directed to the new version of the microservice). Graphed on graph 400 are function 406 (displaying a linear progression in directing traffic to the new version of the microservice) and function 408 (displaying a Nth root progression in directing traffic to the new version of the microservice).

For example, the function can be a linear function, where there are N steps, and an additional D percent of traffic is sent to the canary deployment in each step. The last step can be 100% of traffic. In an example of six steps with 10% jumps, the respective percentages at each step can be 10%, 20%, 30%, 40%, 50%, and 100%.

In another example, the function can be a Nth root (or exponential) function. There can be N steps, and step K is (Nth root of 100)$^K$. So, after N steps, the value can be 100%. This Nth root function can create a smooth, incremental exposure.

FIG. 5 illustrates an example configuration 500, and that can facilitate detecting configuration issues during pre-canary deployment, in accordance with an embodiment of this disclosure.

In some examples, information in configuration 500 can be used by detecting configuration issues during pre-canary deployment component 114 of FIG. 1 to determine a percentage of traffic to direct to a new version of a microservice (compared with a current, production version of the microservice) at various steps in a canary deployment.

In some examples, information in configuration 500 can be used to detect configuration issues during pre-canary deployment.

Configuration 500 comprises configuration 502 and detecting configuration issues during pre-canary deployment component 514 (which can be similar to detecting configuration issues during pre-canary deployment component 114 of FIG. 1).

Configuration 502 is an example configuration allowing "orders" service instances to access Hypertext Transfer Protocol (HTTP) GET methods of a v1 version of a "pricing" service within a staging namespace. There can be an additional condition that the role of user who initiated the request is either a customer or an admin.

```
apiVersion: security.example.com/v1beta1
kind: AuthorizationPolicy
metadata:
  name: pricing
  namespace: staging
spec:
  selector:
    matchLabels:
      app: pricing
      version: v1
  action: ALLOW
  rules:
    from:
      source:
        principals: ["cluster.local/ns/default/sa/orders"]
    to:
      operation:
        methods: ["GET"]
    when:
      key: request.auth.claims[roles]
      values: ["customer", "admin"]
```

FIG. 6 illustrates an example process flow 600 that can facilitate detecting configuration issues during pre-canary deployment, in accordance with an embodiment of this disclosure. In some examples, one or more embodiments of process flow 600 can be implemented by system architecture 100 of FIG. 1, or computing environment 1500 of FIG. 15.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 800 of FIG. 8, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 600 begins with 602, and moves to operation 604.

Operation 604 depicts performing configuration analysis to decompose the configuration changes into manageable size.

After operation 604, process flow 600 moves to operation 606.

Operation 606 depicts establishing a base line.

After operation 606, process flow 600 moves to operation 608.

Operation 608 depicts automatically detecting offending services.

After operation 608, process flow 600 moves to operation 610.

Operation 610 depicts automatically detecting offending configuration(s).

After operation 610, process flow 600 moves to 612, where process flow 600 ends.

According to the present techniques, automated tests can be executed as a part of a continuous integration/continuous deployment (CI/CD) pipeline before a canary deployment process takes place. In a case where failures are encountered, the present techniques can proceed to automatic detection of specific configuration properties that caused the failures.

In some examples, can be done in multiple phases:
Configuration analysis to decompose the configuration changes into a manageable size;
Establish a base line;
Auto detect offending services;
Auto detect the offending configuration(s).

It can be that widespread changes in configuration are uncommon, and it can be that usually, changes are either small or localized in nature. However, especially with microservice-based architectures (such as highly componentized ones), it can be that configuration changes can be located in multiple places, and can affect each other.

Consider a scenario where a particular test failed. Using, for example, log analysis techniques, the following can be derived:
The services on which the failure occurred; and
A dependency graph on which the aforementioned services depend, and also had configuration changes.

It can be that a failure might not be in the service where the configuration change happened, but it can be as a result of a failed dependent. Also, it can be that, if there are multiple failed services, nodes in the dependents can overlap.

For each dependent service, "failed count" can be assigned, which can indicate a number of failed services that are dependent on it.

In some examples, some configuration changes are thrown out from consideration, such as configuration changes on which no failed services depend.

Figure 7:
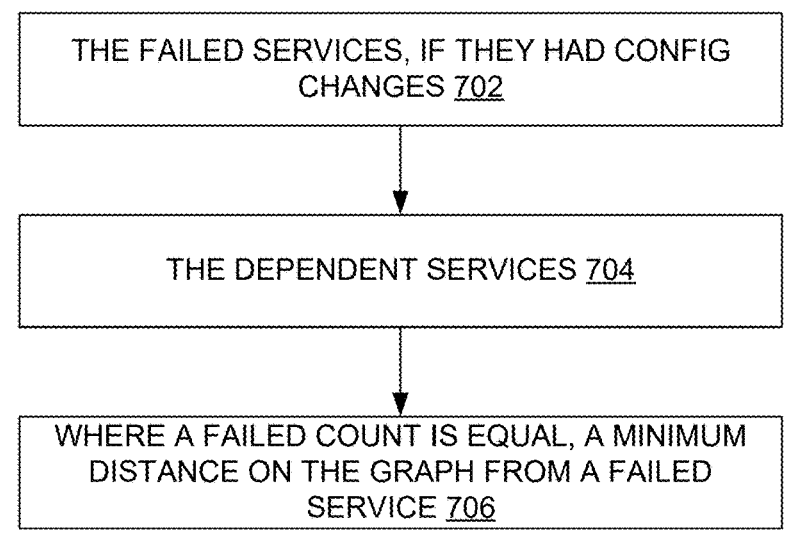
FIG. 7 illustrates an example ordering of services 700 that can facilitate detecting configuration issues during pre-canary deployment, in accordance with an embodiment of this disclosure.

FIG. 7 illustrates an example ordering of services 700 that can facilitate detecting configuration issues during pre-canary deployment, in accordance with an embodiment of this disclosure.

Ordering of services 700 comprises the failed services, if they had configuration changes 702; the dependent services 704; and where a failed count is equal, a minimum distance on the graph from a failed service 706.

An order in which configuration changes can be analyzed can be as follows:
1. The failed services, if they had configuration changes.
2. The dependent services. In some examples, the dependent services are sorted into an order, such as sorted by decreasing failed count. A higher the count can indicate a greater likelihood that a service is a root cause for multiple failures.
3. If the failed count is equal, an order can be made by a minimum distance on the graph from a failed service, with closest first. In other examples, an ordering is not implemented.

In some examples, and within each one of the above, additional decomposition can be made according to configuration sections in which changes were made, grouping each section separately. In some examples, these can also be sorted according to either the test type that failed or to a severity factor. For example, security and scale changes could be more suspect on a failed but operational system, whereas identifiers, uniform resource locators (URLs), and paths can be more suspect on systems where even starting up may be a problem.

Example Process Flows

Figure 8:
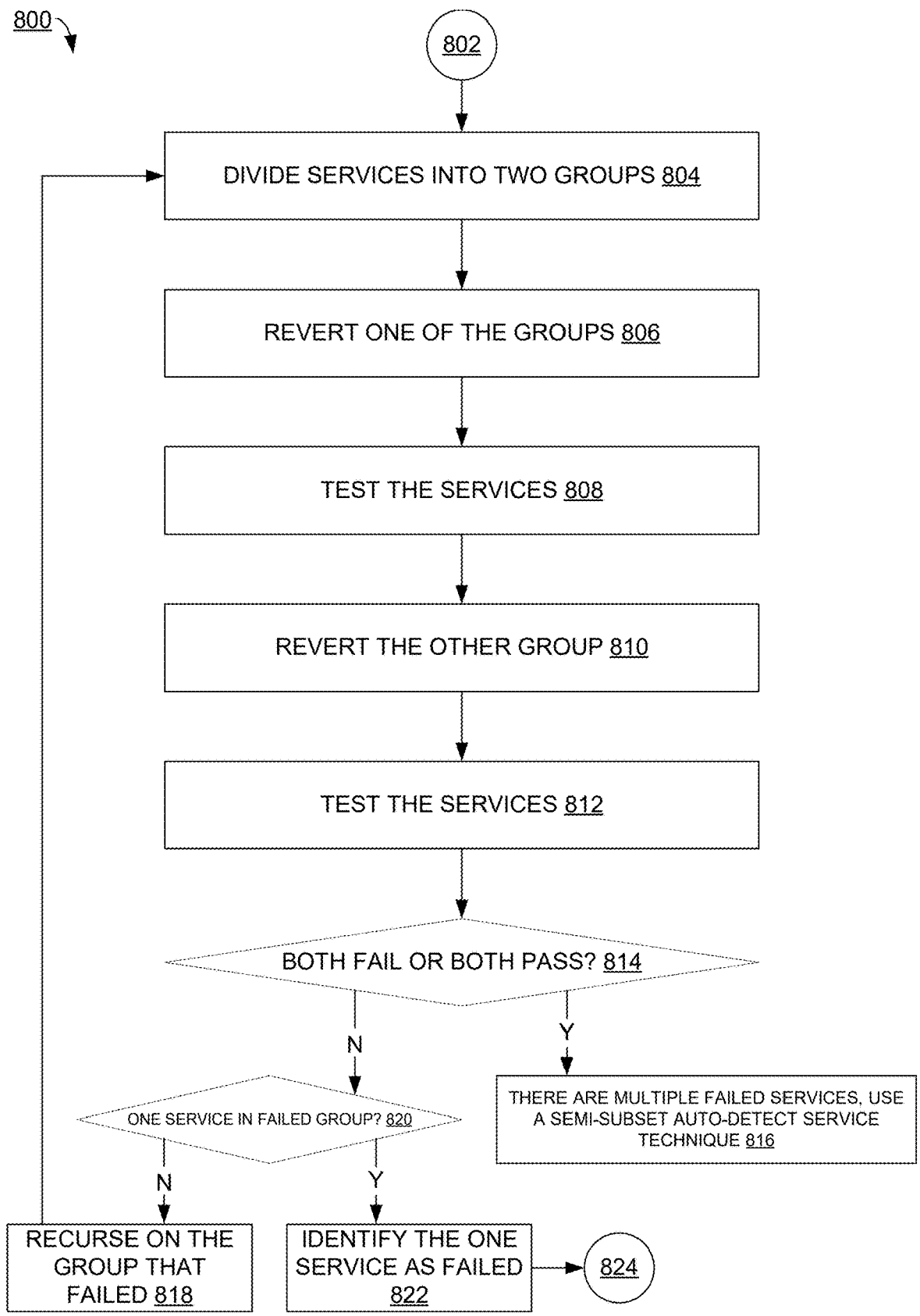
FIG. 8 illustrates an example process flow for a simple auto-detect service technique that can facilitate detecting configuration issues during pre-canary deployment, in accordance with an embodiment of this disclosure.

FIG. 8 illustrates an example process flow 800 for a simple auto-detect service technique that can facilitate detecting configuration issues during pre-canary deployment, in accordance with an embodiment of this disclosure. In some examples, one or more embodiments of process flow 800 can be implemented by system architecture 100 of FIG. 1, or computing environment 1500 of FIG. 15.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 900 of FIG. 9, process flow 1000 of FIG. 10, process flow 1100 of FIG. 11, process flow 1200 of FIG. 12, process flow 1300 of FIG. 13, and/or process flow 1400 of FIG. 14.

Process flow 800 begins with 802, and moves to operation 804. The operations then are to divide services into two groups 804; to revert one of the groups 806; to test the services 808; to revert the other group 810; to test the services 812; to both fail or to both pass? 814; where there are multiple failed services, using a semi-subset auto-detect service technique 816; recurse on the group that failed 818; one service in failed group 822?; identify the one service as failed 822; and can end with 824 (or 816, which can involve switching to a semi-subset auto-detect service technique, as in FIG. 9).

That is, a termination point of process flow 800 can either be to identify one service as failed (822), or where multiple services have failed, switch to a semi-subset auto-detect service technique (824) to identify those multiple services.

Consider an example where there is one problematic service. There are services s1, s2, and s3, where s1 is a problematic service. A first iteration of process flow 800 can be on two sets {s1, s2} and {s3}. Recursion can be performed with set {s1, s2}, and then a second and final iteration of algorithm will be those two sets {s1} and {s2}. Here, where {s1} is the only service in a group of failed services, it can be identified as the problematic service.

A baseline can be established. First, configuration changes can be reverted, to determine whether the system passes the test. If it does not, it can be likely that the failure was due to an additional code change or a test system issue.

Auto-detection of offending services can be performed. If the baseline passes, then it can be that there is a failed scenario and a passed scenario. A search approach can then be formed.

From the analysis, there can be a list of services with configuration changes (which in some examples, can be sorted in a decreasing-likelihood order).

In some examples, two stages can be performed for auto-detection of offending services. A first stage can be referred to as a simple auto-detection service. This can be fast, but work with a single offender. A binary search over the list of services can be performed. That is, divide in two, revert the first half and test, and then the second half. If both fail or both pass (dependent changes), then that can indicate that there is more than one offender. In this case, the second stage can be used. If only one half failed, then a recursive call of the first stage on the failed half can be implemented.

Figure 9:
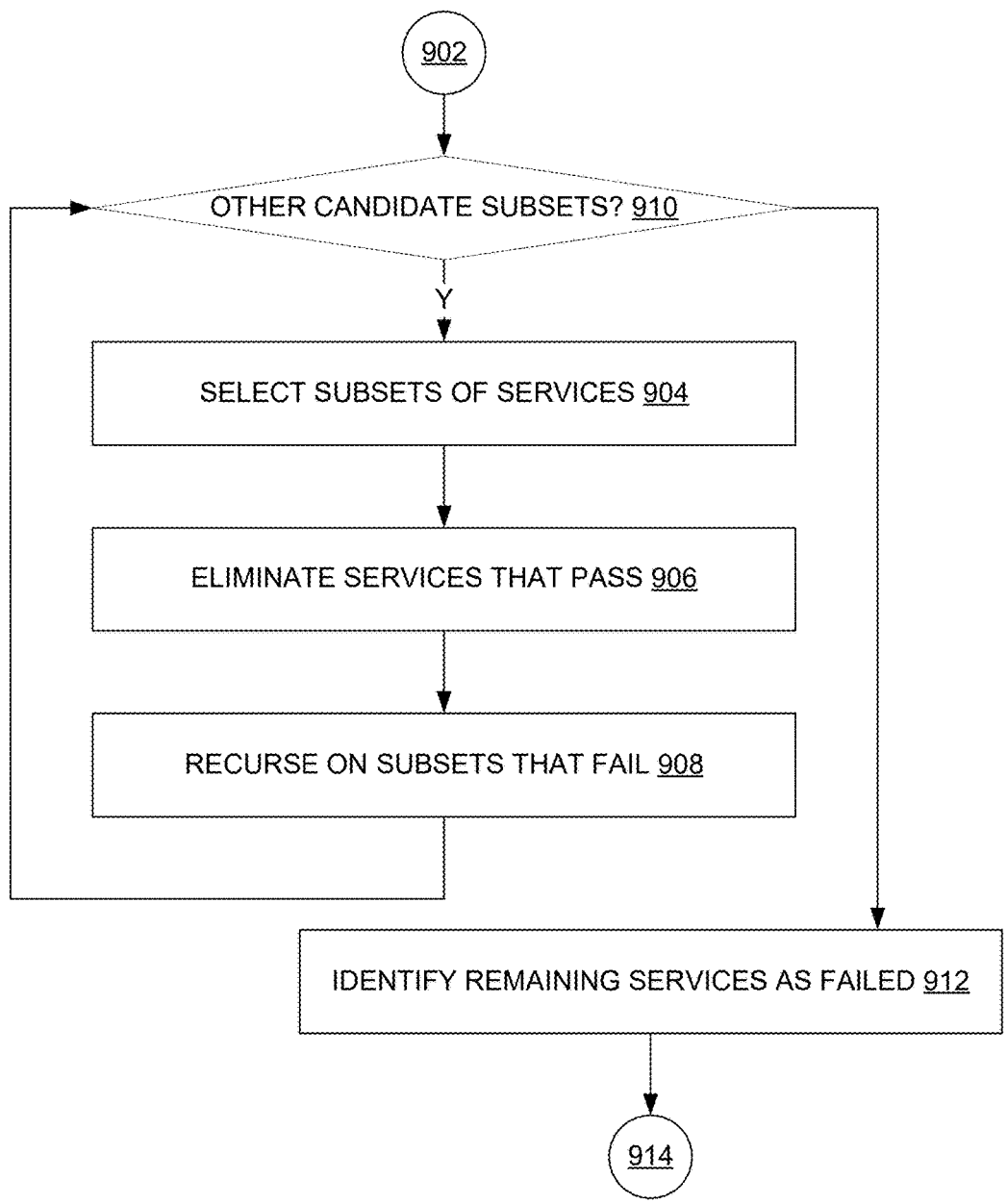
FIG. 9 illustrates an example process flow for a semi-subset auto-detect service technique that can facilitate detecting configuration issues during pre-canary deployment, in accordance with an embodiment of this disclosure.

FIG. 9 illustrates an example process flow 900 for a semi-subset auto-detect service technique that can facilitate detecting configuration issues during pre-canary deployment, in accordance with an embodiment of this disclosure. In some examples, one or more embodiments of process flow 900 can be implemented by system architecture 100 of FIG. 1, or computing environment 1500 of FIG. 15.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 800 of FIG. 8, process flow 1000 of FIG. 10, process flow 1100 of FIG. 11, process flow 1200 of FIG. 12, process flow 1300 of FIG. 13, and/or process flow 1400 of FIG. 14.

Process flow 900 begins with 902, and moves to operation 904. The operations then are select subsets of services 904, eliminate services that pass 906, recurse on subsets that fail 908, other candidate subsets? 910, identify remaining services as failed 912, and ends with 914.

In some examples, process flow 900 can be invoked from operation 824 of FIG. 8. In such examples, it can be that implementing process flow 800 eliminated some services as being failure candidates (that is, it can be determined that those services are fine). In such examples, process flow 900 can begin from a point where those services that have already been determined to be fine are eliminated as possible failing services.

Process flow 900 can end upon determining an exact subset of the services such that, if their configs are reverted, there is no longer a problem.

Put another way, it can be that, after some number of iterations, if there is no reduction in the size of the failure candidates, the resplit can reduce the size of one of the sets so as to increase a probability of exonerating a service. Once the set size is 1, it can mean that the items are being checked one-by-one, and if nothing is exonerated (as determined at 910), process flow 900 can terminate with all the remaining items as the minimal set (that is, failed services; determined at 914).

A second stage (relative to a first stage of FIG. 8) can be referred to as a semi-subset auto-detect service. This can iterate over subsets of the services. Where a set of services passes, then this set can be eliminated from consideration for identifying a failure.

This approach can differ from an exhaustive search, as whole subsets can be removed on instances where they are exonerated even once (e.g., not reverted and passed means that they are proven innocent, so do not test it anymore. Hence the term, "semi" subset.).

With both stages, it can be that an ordering of the list increases a probability that the culprit is in the first part of the list, thus increasing the number of exonerated services in each iteration, thus reducing the practical complexity of the search.

Figure 10:
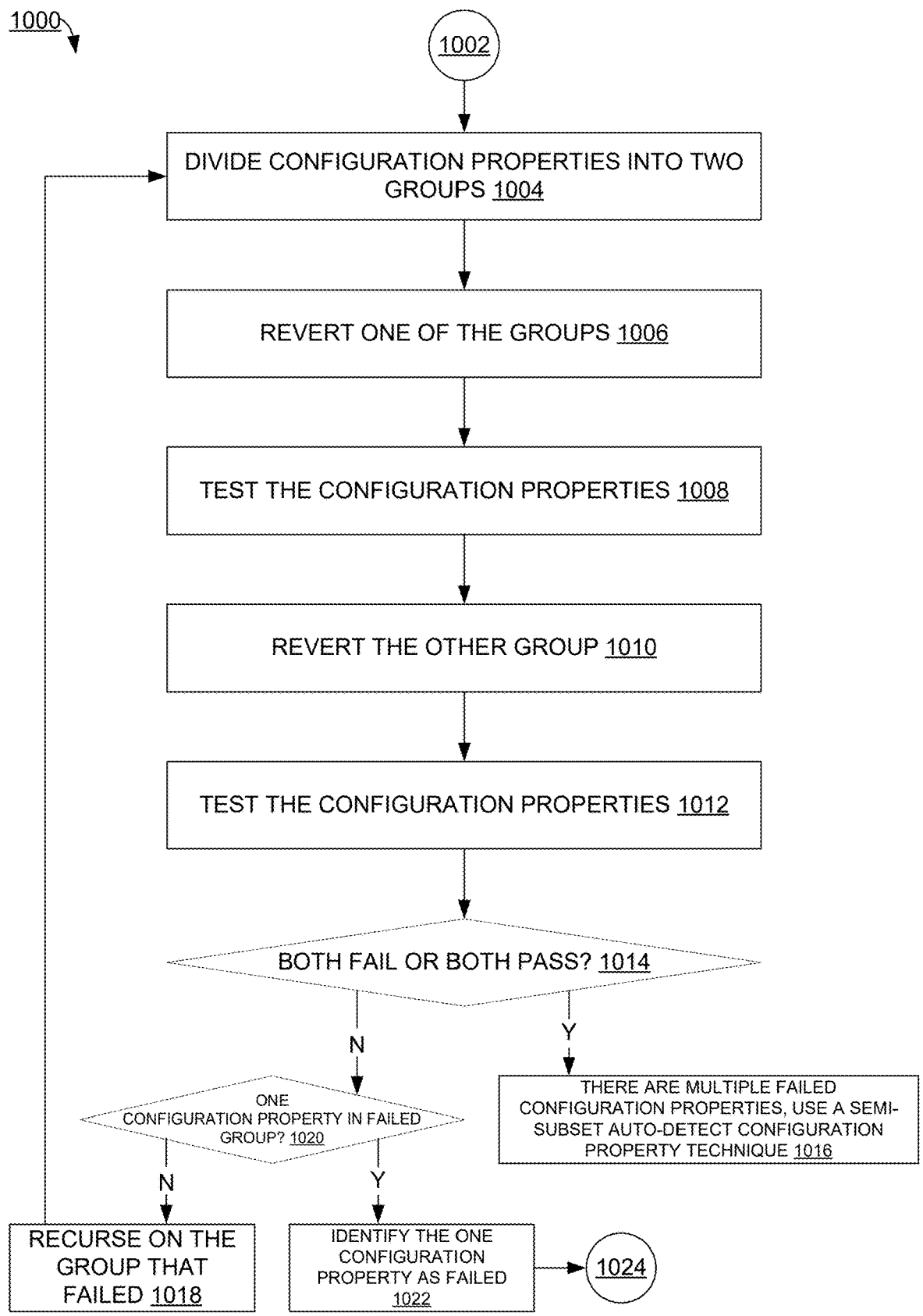
FIG. 10 illustrates an example process flow for a simple auto-detect configuration technique that can facilitate detecting configuration issues during pre-canary deployment, in accordance with an embodiment of this disclosure.

FIG. 10 illustrates an example process flow 1000 for a simple auto-detect configuration technique that can facilitate detecting configuration issues during pre-canary deployment, in accordance with an embodiment of this disclosure. In some examples, one or more embodiments of process flow 1000 can be implemented by system architecture 100 of FIG. 1, or computing environment 1500 of FIG. 15.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 800 of FIG. 8, process flow 900 of FIG. 9, process flow 1100 of FIG. 11, process flow 1200 of FIG. 12, process flow 1300 of FIG. 13, and/or process flow 1400 of FIG. 14.

Process flow 1000 begins with 1002, and moves to operation 1004. The operations then are to divide configuration properties into two groups 1004; revert one of the groups 1006; test the configuration properties 1008; revert the other group 1010; test the configuration properties 1012; both fail or both pass? 1014; there are multiple failed configuration properties, use a semi-subset auto-detect configuration property technique 1016; recurse on the group that failed 1018; one configuration property in failed group 1020?; identify the one configuration property as failed 1022; and can end with 1024 (or 1016, which can involve switching to a semi-subset auto-detect configuration technique, as in FIG. 11).

Auto-detecting offending configs can be performed. After implementing the two-stage technique described above, there can be a narrowed-down list of services that affect the test result. A zoom in on the offending configuration can be performed. This can be performed in a similar manner to the above (with respect to FIG. 8), but at the configuration level.

An initial iteration can be performed over all the configuration sections of these services and then individual legal subsets of configs (e.g., "legal"-test configs where the schema of the configuration is not violated by removing the configuration item). There can be two stages to this.

A first stage can be simple-auto detect config. This can be fast (logarithmic complexity), and able to detect a problem with a single configuration property. A list of the changed configuration properties [c(1), c(2), . . . c(n)] can be split into two lists L1[c(1), . . . . C(n/2)] and L2[c(n/2+1), . . . . C(n)]. The changes in L1 can be reverted and automation tests can be executed on the system. If the failure is still detected, then test in L2. If both fail or both pass—this can indicate that there is more than one issue—so, go to stage 2, below. Otherwise, recurse into the failed half. This recursive technique will continue until there is a single configuration property C(x) that still makes the automation tests fail. If this technique does not succeed because only the joined changes in a few configuration properties cause the failure, then stage 2 can be implemented.

Figure 11:
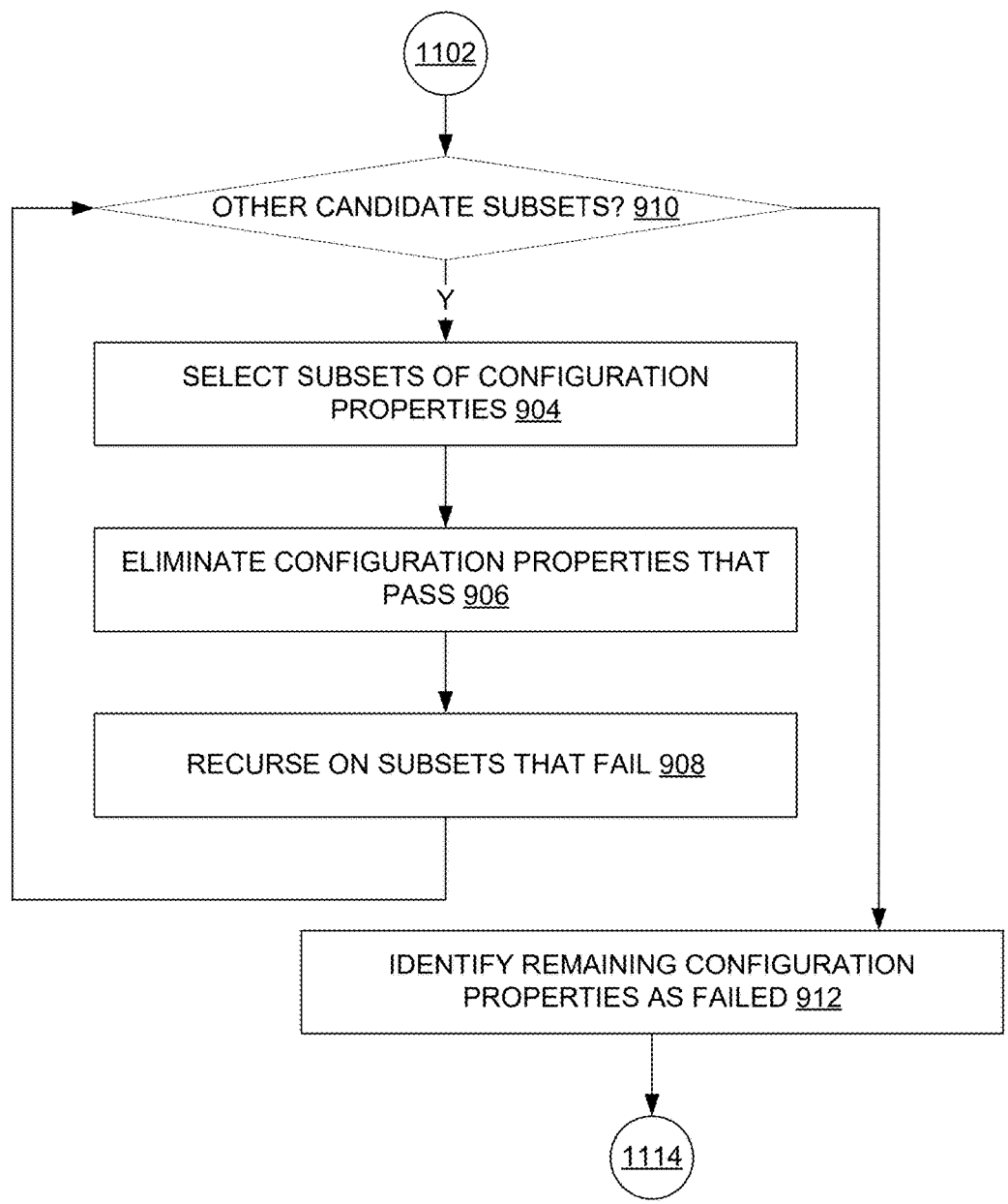
FIG. 11 illustrates an example process flow for a semi-subset auto-detect configuration technique that can facilitate detecting configuration issues during pre-canary deployment, in accordance with an embodiment of this disclosure.

FIG. 11 illustrates an example process flow 1100 for a semi-subset auto-detect configuration technique that can facilitate detecting configuration issues during pre-canary deployment, in accordance with an embodiment of this disclosure. In some examples, one or more embodiments of process flow 1100 can be implemented by system architecture 100 of FIG. 1, or computing environment 1500 of FIG. 15.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 600 of FIG. 6, process flow 800 of FIG. 8, process flow 900 of FIG. 9, process flow 1000 of FIG. 10, process flow 1200 of FIG. 12, process flow 1300 of FIG. 13, and/or process flow 1400 of FIG. 14.

Process flow 1100 begins with 1102, and moves to operation 1104. The operations then are select subsets of configuration properties 1104, eliminate configuration properties that pass 1106, recurse on subsets that fail 1108, other candidate subsets? 910, identify remaining configuration properties as failed 912, and ends with 914.

A second stage (relative to a first stage of FIG. 10) can be semi-subset auto-detect config. This technique can be implemented to detect a subset of interrelated changed properties that cause a failure, but can be more computationally intensive than stage 1. As before, it can be that any subset of configs that under any combination does not cause a failure, can be exonerated and illuminated from the search.

An examination can be made of possible subsets within a list of configuration changes [c(1), c(2), ... c(n)]. Where a subset of the combinations causes the test to pass, this subset can be removed from the list, which can result in convergence in a reasonable time. It can be that the exhaustive subset will be only on the final list [c(i1), c(i2), ... c(ik)] that are all culprits.

Figure 12:
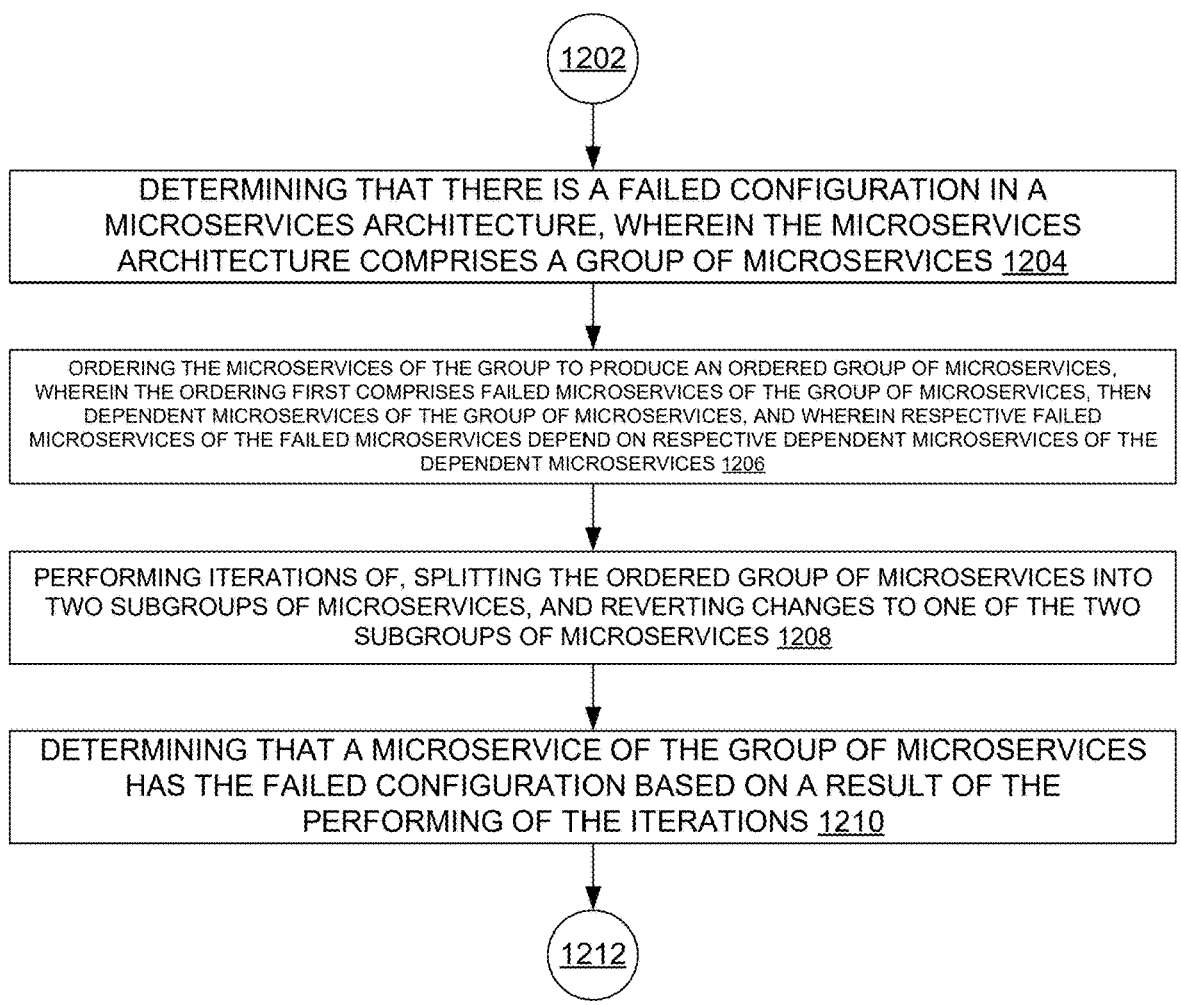
FIG. 12 illustrates an example process flow that can facilitate detecting configuration issues during pre-canary deployment, in accordance with an embodiment of this disclosure.

FIG. 12 illustrates an example process flow 1200 that can facilitate detecting configuration issues during pre-canary deployment, in accordance with an embodiment of this disclosure. In some examples, one or more embodiments of process flow 1200 can be implemented by system architecture 100 of FIG. 1, or computing environment 1500 of FIG. 15.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 600 of FIG. 6, process flow 800 of FIG. 8, process flow 900 of FIG. 9, process flow 1000 of FIG. 10, process flow 1100 of FIG. 11, process flow 1300 of FIG. 13, and/or process flow 1400 of FIG. 14.

Process flow 1200 begins with 1202, and moves to operation 1204.

Operation 1204 depicts determining that there is a failed configuration in a microservices architecture, wherein the microservices architecture comprises a group of microservices. This microservices architecture can be similar to microservices mesh 108 of FIG. 1, and the failed configuration can be identified as a result of performing a test on the microservice architecture as part of deploying at least part of the microservice architecture.

After operation 1204, process flow 1200 moves to operation 1206.

Operation 1206 depicts ordering the microservices of the group to produce an ordered group of microservices, wherein the ordering first comprises failed microservices of the group of microservices, then dependent microservices of the group of microservices, and wherein respective failed microservices of the failed microservices depend on respective dependent microservices of the dependent microservices. This ordering can be similar to that described with respect to FIG. 5.

In some examples, the failed microservices correspond to configuration changes. Configuration changes for microservices that fail can be analyzed first in an ordering of configuration changes.

In some examples, operation 1206 comprises ordering the dependent microservices within the ordered group of microservices based on a decreasing count of failed microservices that depend on the respective dependent microservices. This can comprise, in an ordering, after the failed services, ordering the dependent services. This can be done by decreasing failed count.

In some examples, operation 1206 comprises ordering a first dependent microservice of the ordered group of microservices before a second dependent microservice of the ordered group of microservices, where the first dependent microservice and the second dependent microservice correspond to a same number of failed microservices, based on the first dependent microservice having a closer graph distance from a failed microservice in a graph data structure of the group of microservices. That is, if a failed count is equal, the ordering can be done based on a minimum distance on a graph from a failed service.

In some examples, respective failed microservices of the group of microservices are ordered within the ordered group of microservices based on respective configuration sections that have been changed. In some examples, respective failed microservices of the group of microservices are ordered within the ordered group of microservices based on respective test types that failed. In some examples, respective failed microservices of the group of microservices are ordered within the ordered group of microservices based on respective severity metrics. That is, within a sub-ordering (e.g., failed microservices), additional decomposition can be made according to the configuration sections in which the changes were made, grouping each section separately. In other examples, a sorting can be performed according to the test type that failed and/or to a severity factor.

After operation 1206, process flow 1200 moves to operation 1208.

Operation 1208 depicts performing iterations of, splitting the ordered group of microservices into two subgroups of microservices, and reverting changes to one of the two subgroups of microservices. This can be similar to a simple auto-detect service technique, as described herein.

After operation 1208, process flow 1200 moves to operation 1210.

Operation 1210 depicts determining that a microservice of the group of microservices has the failed configuration based on a result of the performing of the iterations. That is, a result of implementing a simple auto-detect service technique can be to identify a failed configuration.

After operation 1210, process flow 1200 moves to 1212, where process flow 1200 ends.

Figure 13:
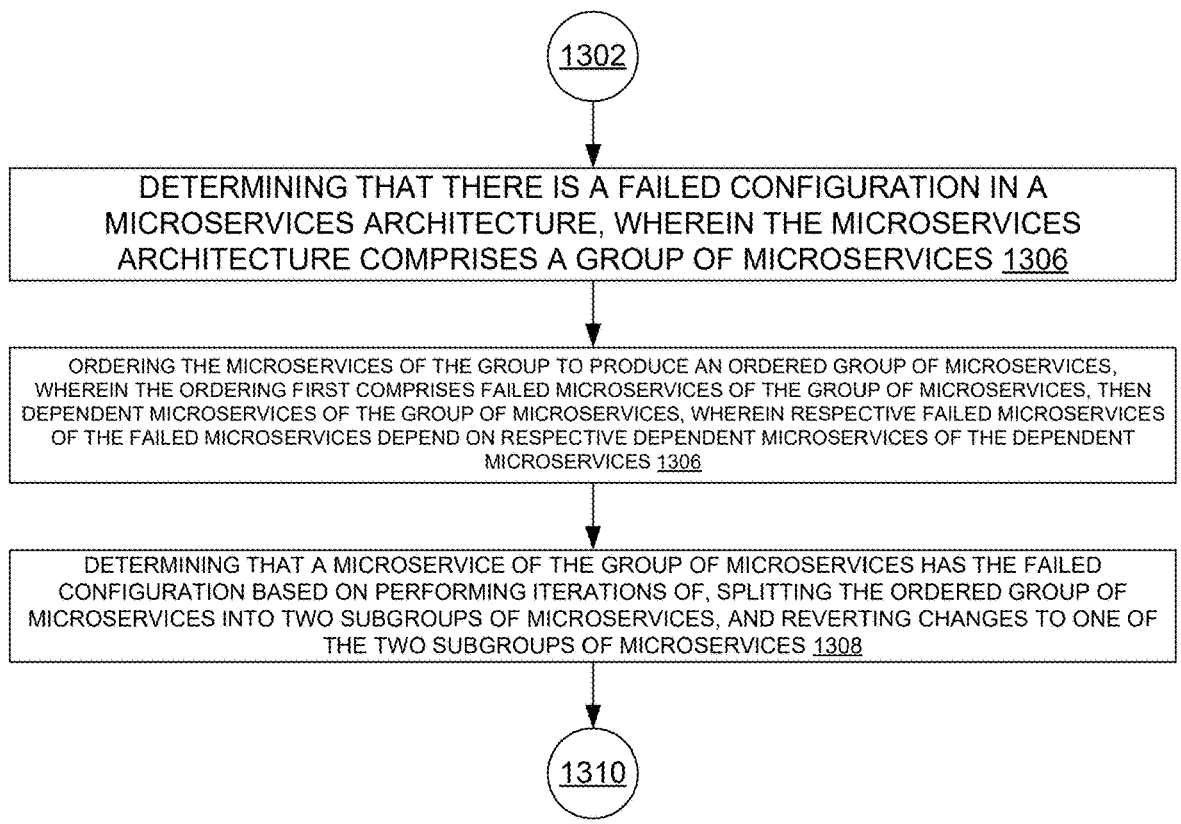
FIG. 13 illustrates an example process flow that can facilitate detecting configuration issues during pre-canary deployment, in accordance with an embodiment of this disclosure.

FIG. 13 illustrates an example process flow 1300 that can facilitate detecting configuration issues during pre-canary deployment, in accordance with an embodiment of this disclosure. In some examples, one or more embodiments of process flow 1300 can be implemented by system architecture 100 of FIG. 1, or computing environment 1500 of FIG. 15.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 600 of FIG. 6, process flow 800 of FIG. 8, process flow 900 of FIG. 9, process flow 1000 of FIG. 10, process flow 1100 of FIG. 11, process flow 1200 of FIG. 12, and/or process flow 1400 of FIG. 14.

Process flow 1300 begins with 1302, and moves to operation 1304.

Operation 1304 depicts determining that there is a failed configuration in a microservices architecture, wherein the microservices architecture comprises a group of microservices. In some examples, operation 1304 can be implemented in a similar manner as operation 1204 of FIG. 12.

After operation 1304, process flow 1300 moves to operation 1306.

Operation 1306 depicts ordering the microservices of the group to produce an ordered group of microservices, wherein the ordering first comprises failed microservices of the group of microservices, then dependent microservices of the group of microservices, wherein respective failed microservices of the failed microservices depend on respective dependent microservices of the dependent microservices. In some examples, operation 1306 can be implemented in a similar manner as operation 1206 of FIG. 12.

In some examples, the ordered group of microservices omits microservices that do not correspond to a configuration change. That is, it can be that configuration changes for which no failed microservices depend on can be discarded as a part of determining a failed configuration.

In some examples, the failed configuration is part of a group of new configurations that replace a group of old configurations, the failed configuration corresponds to a test that failed, and operation 1306 comprises determining that the group of microservices passes the test when reverted to the group of old configurations before performing the ordering of the group of microservices. That is, configuration changes can be reverted to determine whether the microservices pass the test. Where it does not, it can be determined that a failure is due to an additional configuration change (or a test system issue).

After operation 1306, process flow 1300 moves to operation 1308.

Operation 1308 depicts determining that a microservice of the group of microservices has the failed configuration based on performing iterations of, splitting the ordered group of microservices into two subgroups of microservices, and reverting changes to one of the two subgroups of microservices. In some examples, operation 1308 can be implemented in a similar manner as operation 1208 of FIG. 12.

In some examples, the determining that the microservice of the group of microservices has the failed configuration is performed based on creating a dependency graph of the group of microservices that identifies dependencies within the group of microservices, and that identifies a configuration change within the group of microservices. That is, a dependency graph on which microservices depend, and which had configuration changes, can be determined.

In some examples, performing the iterations comprises performing a first iteration to determine that a first subgroup of the two subgroups of microservice failed, and performing a second iteration on the first subgroup. That is, where only one subgroup fails, a recursive iteration can be performed on that subgroup.

In some examples, the iterations are first iterations, the subgroups are first subgroups, and operation 1308 comprises, based on determining, based on the first iterations, that there are multiple failed configurations in the microservices architecture, performing second iterations over second subgroups of the group of microservices to identify the multiple failed configurations. That is, a semi-subset auto-detect technique can be implemented.

In some examples, the microservice corresponds to a group of configurations, the iterations are first iterations, and operation 1308 comprises identifying changed configurations of the group of configurations; and performing second iterations of, splitting the changed configurations into two subgroups of changed configurations, and reverting changes to one of the two subgroups of changed configurations. This can be a simple auto-detect configuration technique, as described herein.

In some examples, the subgroups are first subgroups, and operation 1308 comprises, based on determining, based on the second iterations, that there are multiple failed configurations in the group of configurations, performing third iterations over second subgroups of the group of configurations to identify the multiple failed configurations. That is, a semi-subset auto-detect technique can be implemented.

In some examples, the second subgroups comprise subgroups, and the subgroups adhere to a scheme of the group of configurations. That is, it can be that legal subsets of configurations are iterated over, where "legal" indicates that a scheme of a configuration is not violated by removing a particular configuration item.

After operation 1308, process flow 1300 moves to 1310, where process flow 1300 ends.

FIG. 14 illustrates an example process flow 1400 that can facilitate detecting configuration issues during pre-canary deployment, in accordance with an embodiment of this disclosure. In some examples, one or more embodiments of process flow 1400 can be implemented by system architecture 100 of FIG. 1, or computing environment 1500 of FIG. 15.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 600 of FIG. 6, process flow 800 of FIG. 8, process flow 900 of FIG. 9, process flow 1000 of FIG. 10, process flow 1100 of FIG. 11, process flow 1200 of FIG. 12, and/or process flow 1300 of FIG. 13.

Process flow 1400 begins with 1402, and moves to operation 1404.

Operation 1404 depicts determining there is a failed configuration in a microservices architecture that comprises microservices. In some examples, operation 1404 can be implemented in a similar manner as operation 1204 of FIG. 12.

After operation 1404, process flow 1400 moves to operation 1406.

Operation 1406 ordering the microservices to produce ordered microservices. In some examples, operation 1406 can be implemented in a similar manner as operation 1206 of FIG. 12.

After operation 1406, process flow 1400 moves to operation 1408.

Operation 1408 identifying that a microservice of the microservices has the failed configuration based on performing iterations of, splitting the ordered microservices into two groups of microservices, and reverting changes to one of the two groups of microservices. In some examples, operation 1408 can be implemented in a similar manner as operations 1208-1210 of FIG. 12.

In some examples, the determining, the ordering, and the identifying are performed by a continuous integration and continuous deployment component that is configured to deploy the microservices. This can be similar to CI/CD 202 of FIG. 2.

In some examples, the iterations are first iterations, the groups are first groups, and operation 1408 comprises, based on determining, based on the first iterations, that there are multiple failed configurations in the microservices architecture, performing second iterations over second groups of the microservices to identify the multiple failed configurations. This can be similar to a semi-subset auto-detect service technique.

In some examples, the microservice corresponds to a group of configurations, the iterations are first iterations, and operation 1408 comprises identifying changed configurations of the group of configurations; and performing second iterations of, splitting the changed configurations into two groups of changed configurations, and reverting changes to one of the two groups of changed configurations. This can be similar to a semi-subset auto-detect configuration technique.

After operation 1408, process flow 1400 moves to 1410, where process flow 1400 ends.

Example Operating Environment

In order to provide additional context for various embodiments described herein, FIG. 15 and the following discussion are intended to provide a brief, general description of a suitable computing environment 1500 in which the various embodiments of the embodiment described herein can be implemented.

For example, parts of computing environment 1500 can be used to implement one or more embodiments of server 102 and/or client 106 of FIG. 1.

In some examples, computing environment 1500 can implement one or more embodiments of the process flows of FIGS. 6 and/or 8-14 to detect configuration issues during pre-canary deployment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a nonvolatile storage such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples, and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1516 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one processor; and
    a memory that stores executable instructions that, when executed by the at least one processor, facilitate performance of operations, comprising:
        determining that there is a failed configuration in a microservices architecture, wherein the microservices architecture comprises a group of microservices;
        ordering the microservices of the group to produce an ordered group of microservices, wherein the ordering first comprises failed microservices of the group of microservices, then dependent microservices of the group of microservices, and wherein respective failed microservices of the failed microservices depend on respective dependent microservices of the dependent microservices;
        performing iterations of,
            splitting the ordered group of microservices into two subgroups of microservices, and
            reverting changes to one of the two subgroups of microservices; and
        determining that a microservice of the group of microservices has the failed configuration based on a result of the performing of the iterations.

2. The system of claim 1, wherein the failed microservices correspond to configuration changes.

3. The system of claim 1, wherein the operations further comprise:
    ordering the dependent microservices within the ordered group of microservices based on a decreasing count of failed microservices that depend on the respective dependent microservices.

4. The system of claim 3, wherein the operations further comprise:
    ordering a first dependent microservice of the ordered group of microservices before a second dependent microservice of the ordered group of microservices, and
    wherein the first dependent microservice and the second dependent microservice correspond to a same number of failed microservices, based on the first dependent microservice having a closer graph distance from a failed microservice in a graph data structure of the group of microservices.

5. The system of claim 1, wherein respective failed microservices of the group of microservices are ordered within the ordered group of microservices based on respective configuration sections that have been changed.

6. The system of claim 1, wherein respective failed microservices of the group of microservices are ordered within the ordered group of microservices based on respective test types that failed.

7. The system of claim 1, wherein respective failed microservices of the group of microservices are ordered within the ordered group of microservices based on respective severity metrics.

8. A method, comprising:
    determining, by a system comprising at least one processor, that there is a failed configuration in a microservices architecture, wherein the microservices architecture comprises a group of microservices;
    ordering, by the system, the microservices of the group to produce an ordered group of microservices, wherein the ordering first comprises failed microservices of the group of microservices, then dependent microservices of the group of microservices, wherein respective failed microservices of the failed microservices depend on respective dependent microservices of the dependent microservices; and
    determining, by the system, that a microservice of the group of microservices has the failed configuration based on performing iterations of,
        splitting the ordered group of microservices into two subgroups of microservices, and
        reverting changes to one of the two subgroups of microservices.

9. The method of claim 8, wherein the determining that the microservice of the group of microservices has the failed configuration is performed based on creating a dependency graph of the group of microservices that identifies dependencies within the group of microservices, and that identifies a configuration change within the group of microservices.

10. The method of claim 8, wherein the ordered group of microservices omits microservices that do not correspond to a configuration change.

11. The method of claim 8, wherein the failed configuration is part of a group of new configurations that replace a group of old configurations, wherein the failed configuration corresponds to a test that failed, and further comprising:

determining, by the system, that the group of microservices passes the test when reverted to the group of old configurations before performing the ordering of the group of microservices.

12. The method of claim 8, wherein performing the iterations comprises:
performing a first iteration to determine that a first subgroup of the two subgroups of microservice failed; and
performing a second iteration on the first subgroup.

13. The method of claim 8, wherein the iterations are first iterations, wherein the subgroups are first subgroups, and further comprising:
based on determining, based on the first iterations, that there are multiple failed configurations in the microservices architecture, performing second iterations, by the system, over second subgroups of the group of microservices to identify the multiple failed configurations.

14. The method of claim 8, wherein the microservice corresponds to a group of configurations, wherein the iterations are first iterations, and further comprising:
identifying changed configurations of the group of configurations;
performing second iterations of,
splitting the changed configurations into two subgroups of changed configurations, and
reverting changes to one of the two subgroups of changed configurations.

15. The method of claim 14, wherein the subgroups are first subgroups, and further comprising:
based on determining, based on the second iterations, that there are multiple failed configurations in the group of configurations, performing third iterations, by the system, over second subgroups of the group of configurations to identify the multiple failed configurations.

16. The method of claim 15, wherein the second subgroups comprise subgroups, and wherein the subgroups adhere to a scheme of the group of configurations.

17. A non-transitory computer-readable medium comprising instructions that, in response to execution, cause a system comprising at least one processor and facilitating execution of a computing service to perform operations, comprising:
determining there is a failed configuration in a microservices architecture that comprises microservices;
ordering the microservices to produce ordered microservices; and
identifying that a microservice of the microservices has the failed configuration based on performing iterations of,
splitting the ordered microservices into two groups of microservices, and
reverting changes to one of the two groups of microservices.

18. The non-transitory computer-readable medium of claim 17, wherein the determining, the ordering, and the identifying are performed by a continuous integration and continuous deployment component that is configured to deploy the microservices.

19. The non-transitory computer-readable medium of claim 17, wherein the iterations are first iterations, wherein the groups are first groups, and wherein the operations further comprise:
based on determining, based on the first iterations, that there are multiple failed configurations in the microservices architecture, performing second iterations over second groups of the microservices to identify the multiple failed configurations.

20. The non-transitory computer-readable medium of claim 17, wherein the microservice corresponds to a group of configurations, wherein the iterations are first iterations, and wherein the operations further comprise:
identifying changed configurations of the group of configurations;
performing second iterations of,
splitting the changed configurations into two groups of changed configurations, and
reverting changes to one of the two groups of changed configurations.

\* \* \* \* \*